United States Patent [19]

Schrenk

[11] Patent Number: 4,648,076
[45] Date of Patent: Mar. 3, 1987

[54] CIRCUIT HAVING A DATA MEMORY AND ADDRESSING UNIT FOR READING, WRITING AND ERASING THE MEMORY

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 609,875

[22] Filed: May 14, 1984

[30] Foreign Application Priority Data

May 18, 1983 [DE] Fed. Rep. of Germany ....... 3318123

[51] Int. Cl.$^4$ .............................................. G11C 11/40
[52] U.S. Cl. ................... 365/230; 365/218; 235/488
[58] Field of Search ............ 365/230, 218, 189; 235/487, 488, 492, 380, 382, 382.5

[56] References Cited

U.S. PATENT DOCUMENTS

| | | | |
|---|---|---|---|
| 4,105,156 | 8/1978 | Dethloff | 235/487 |
| 4,211,919 | 7/1980 | Ugon | 235/487 |
| 4,295,041 | 10/1981 | Ugon | 235/487 |

FOREIGN PATENT DOCUMENTS 54-98124 2/1979 Japan.

Primary Examiner—Terrell W. Fears
Attorney, Agent, or Firm—Herbert L. Lerner; Laurence A. Greenberg

[57] ABSTRACT

A circuit includes a data memory having an input and non-volatile storage cells being electrically writable and erasable, a function data memory having an input, an output, and a storage cell, an address decoder having an output connected to the input of the data memory and an output connected to the input of the function data memory for addressing the storage cells of the data memory and the storage cell of the function data memory, a logic unit connected to the output of the function data memory, and an addressing unit connected to the data memory and to the logic unit for reading, writing and erasing partial regions of the data memory.

9 Claims, 3 Drawing Figures

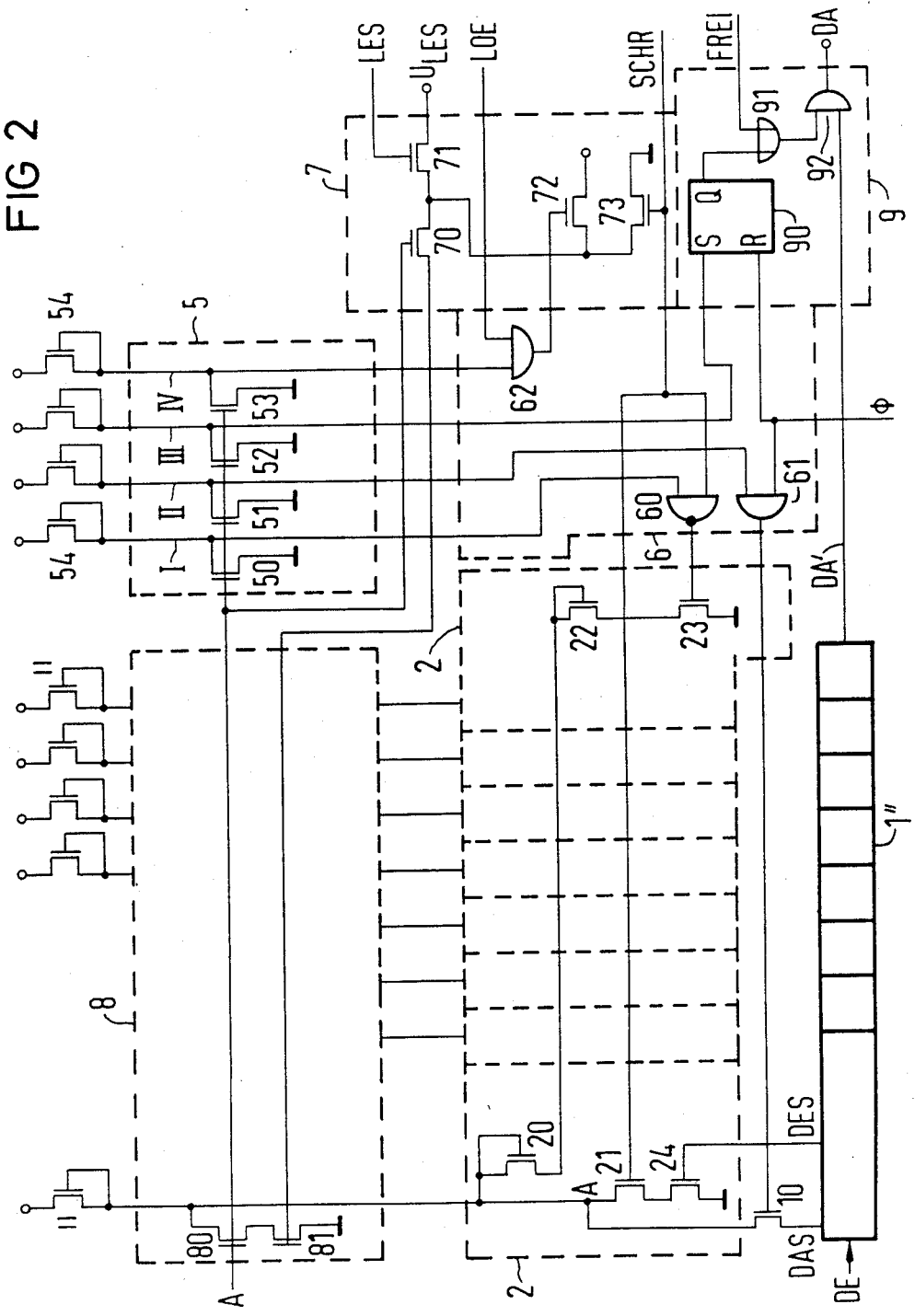

| I | II | III | IV | READOUT OF THE FIRST MEMORY REGION IN REGISTER | READOUT FROM REGISTER | ERASING OF THE FIRST MEMORY REGION | WRITING OF THE FIRST MEMORY REGION | STORAGE PROPERTIES OF THE FIRST MEMORY REGION |
|---|---|---|---|---|---|---|---|---|
| 1 | 1 | 1 | 1 | POSSIBLE | POSSIBLE | POSSIBLE | POSSIBLE | ELECTRICALLY ERASABLE PROGRAMMABLE MEMORY (EEPROM) |
| 1 | 1 | 1 | 0 | = | = | NOT POSSIBLE | = | PROGRAMMABLE MEMORY (PROM) |
| 0 | 1 | 1 | 0 | = | = | = | NOT POSSIBLE | ONLY READ MEMORY (ROM) |
| 1 | 1 | 0 | 1 | = | POSSIBLE IN THE PRESENCE OF A RELEASE SIGNAL | POSSIBLE | POSSIBLE | EEPROM } AFTER A SUCCESSFUL RELEASE OPERATION |
| 1 | 1 | 0 | 0 | = | = | FREI NOT POSSIBLE | = | PROM |
| 0 | 1 | 0 | 0 | = | = | = | NOT POSSIBLE | ROM |
| X | 0 | X | X | NOT POSSIBLE | X | X | X | READABLE ONLY FOR INTERNAL DATE COMPARISON |

FIG 3

CIRCUIT HAVING A DATA MEMORY AND ADDRESSING UNIT FOR READING, WRITING AND ERASING THE MEMORY

The invention relates to a circuit including a data memory with non-volatile electrically writable and erasable storage cells, an addressing decoder, and an addressing unit for reading, writing and erasing partial regions of the memory.

From the journal "Electronics" a data memory is known which can be read, written and erased electrically through an addressing unit. The writing into the memory has been described by W. S. Johnson, G. L. Kuhn, A. L. Renninger and D. Perlegos under the title "16-KEE-PROM Relies on Tunneling for Byte-Erasable Program Storage" in the Feb. 28, 1980 issue, pages 113 et seq. However, there are applications for such a memory, in which it is desirable to have memories with limited functional properties available, besides an address region which is unlimited with respect to the function properties. This is a requirement, for instance, if the memory is used in data-controlled payment systems for the cashless payment for merchandise or for the settling of services performed and the like. Payment systems of this kind are described in the journal "Betriebspraxis", B.BL. 2/1982, pages 48 et seq. by Dr. R. Novak and W. Roeder under the title "Die Chipkarte—naechste Generation der Automatenkarte" (The Chip Card—the Next Generation of Automation Cards). The cards used in this case carry a non-volatile electric data memory as an essential element which can be accessed through electric contacts at the surface of the card. Through the use of a card reader, an aritlumetic unit accesses the memory content which is optionally changed in the process, for every use.

Such cards are used in security and access systems, in accounting or recording systems and in debit or credit systems. In order to assure a wide distribution and frequent use of the cards, there are operators of such systems who issue a large number of cards and offer a widespread network of readers and computing units. In order to preclude abuse of the data, stringent security requirements must be imposed on the card systems. The distribution of the carrier cards cannot always be controlled, and therefore the carrier cards must be protected against use by unauthorized persons.

This can be accomplished by a release operation, in which a comparison of data is performed between a code word which is entered by an operator or encoded by a computing unit, and a stored reference word, and access is released or blocked depending on the result of the comparison. During the release operation, access should be possible, on the one hand, to a predetermined address region of the memory, but on the other hand, access to a user data region occupied by secret or protected data is to be blocked.

Depending on the application of the memory, erasing, writing or reading of the user data region should be prevented without successful completion of the release operation. Additionally, a further memory region, which serves for accepting the secret reference data, can be protected against reading into an externally readable register under any circumstances.

A third memory region can be provided with variable or state-dependent access inhibitors for the interim storage of data which are produced during the release operation. A release operation which may require a data comparison, writing and possibly erasing, of this third memory region dependent thereon, can consequently be acted upon sequentially by a write and erase inhibitor, dependent on the release operation, which can be cancelled only if the release operation proceeds properly.

The optimum division of a memory into regions with different properties depends on the application itself and the pertaining security requirements.

It is accordingly an object of the invention to provide a circuit having a data memory and an addressing unit for reading, writing and erasing the memory, which overcomes the hereinafore-mentioned disadvantages of the heretofore-known devices of this general type, and which permits a flexible matching of the memory properties to the desired requirements.

With the foregoing and other objects in view there is provided, in accordance with the invention, a circuit, comprising a data memory having an input and non-volatile storage cells being electrically writable and erasable, a function data memory having an input, an output, and a storage cell, an address decoder having an output connected to the input of the data memory and an output connected to the input of the function data memory for addressing the storage cells of the data memory and the storage cell of the function data memory, a logic unit connected to the output of the function data memory, and an addressing unit connected to the data memory and to the logic unit for reading, writing and erasing partial regions of the data memory.

In this manner, a dependence on the address of the function properties "readable", "writable" and "erasable" of the data memory, is achieved. Programming the function data memory fixes the memory regions of the data memory which have, for instance, the properties of an electrically erasable, programmable memory (EEPROM), a programmable memory (PROM) or a read-only memory (ROM).

In accordance with another feature of the invention, the function data memory is an electrically erasable programmable memory.

In accordance with a further feature of the invention, the function data memory is a mask-programmable read-only memory.

In accordance with an added feature of the invention, one or more address in the data memory is assigned to an address in the function data memory.

In accordance with an additional feature of the invention, the function data memory contains a second memory region, four memory locations associated with each address in the second memory region, and column lines for reading out the memory locations.

In accordance with again another feature of the invention, there are provided means for delivering a write signal to the addressing unit, the column lines including a first column line delivering a signal for suppressing the write signal.

In accordance with again a further feature of the invention, there are provided means for delivering a read signal to the addressing unit, the column lines including a second column line delivering a signal for suppressing the read signal.

In accordance with again an added feature of the invention, there are provided a read inhibitor connected to the function data memory, a register connected to the read inhibitor and being acted upon by the read inhibitor, means for delivering a release signal to the read inhibitor, and the column lines including a third column line connected to the read inhibitor for neutralizing or cancelling the read inhibitor independently of the release signal.

In accordance with a concomitant feature of the invention, there are provided means for delivering an erase signal to the addressing unit, the column lines including a fourth column line delivering a signal for suppressing the erase signal.

Other features which are considered as characteristic for the invention are set forth in the appended claims.

Although the invention is illustrated and described herein as embodied in a circuit having a data memory and addressing unit for reading, writing and erasing the memory, it is nevertheless not intended to be limited to the details shown, since various modifications and structural changes mey be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is a schematic circuit diagram showing details of an embodiment of the circuit configuration according to FIG. 1; and FIG. 3 is a table showing the functional properties of memory regions of the data memory according to FIGS. 1 and 2, for an example of the occupancy of the function data memory.

Figure 1:
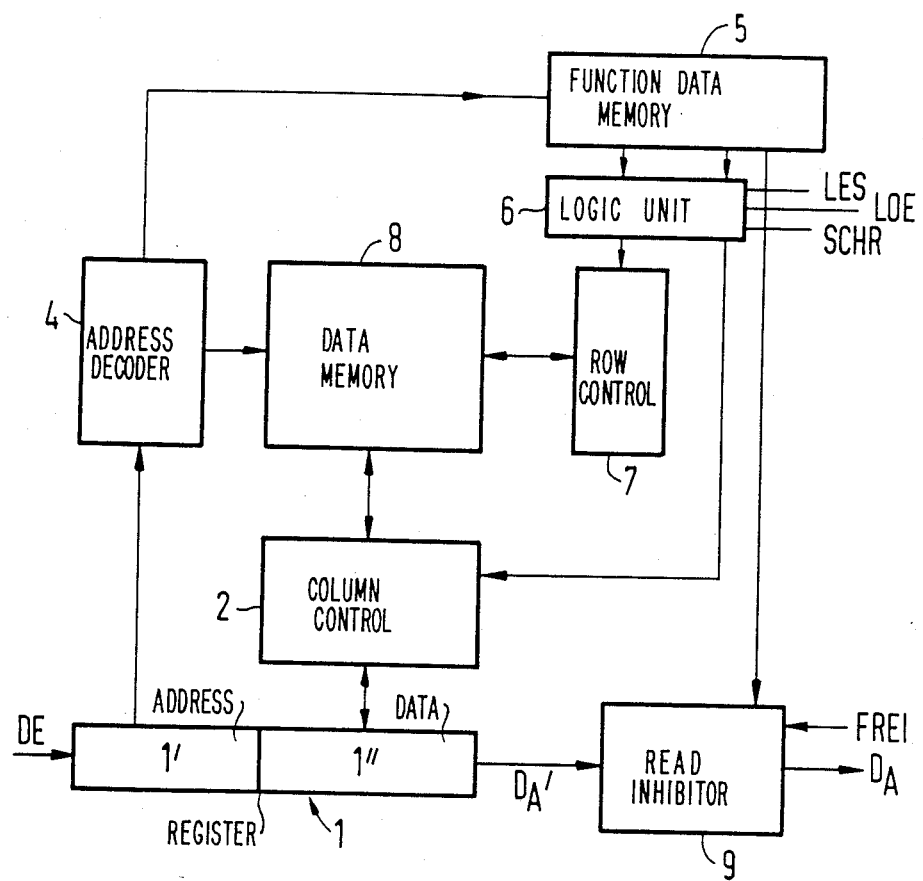
FIG. 1 is a block circuit diagram of the circuit configuration of the invention.

Referring now to the figures of the drawing in detail and first particularly to FIG. 1 thereof, there is seen a monolithically integrable circuit configuration which may be placed, for instance, on a carrier card for use in a cashless payment system as is described above. A serial data exchange with a non-illustrated computing unit takes place through a data input line and a data output line, respectively. The binary-coded bit sequences are received in this case by a register 1 formed of an address register 1' and a data register 1''. A read inhibitor 9 acting on a data output line DA causes the reading of data from the register 1 to be dependent on an output signal of a function data memory 5 and on a release signal FREI. The release signal is generated after the successful execution of a release operation, i.e., after a comparison of the entered code and stored reference data, in a non-illustrated test circuit. Reference numeral 8 designates a data memory which can be addressed row-wise and column-wise, with non-volatile electrically writable and erasable storage cells. Addressing is accomplished through an address decoder 4 which has an input connected to the address register 1'. The function data memory 5, which is organized row-wise and column-wise, is likewise addressed by the address decoder 4 which jointly addresses the data memory 8.

The address register 1' contains a bit sequence. A first memory region in the data memory 8, such as for receiving a data word, is addressed by the bit sequence together with a second memory region in the function data memory 5 which can be constructed for receiving one or more bits. The contents of the second memory region of the friction data memory 5 is fed to a logic unit 6, in order to determine to what extent a respective read, write or erase signal LES, SCHR, LOE becomes effective. The corresponding storage location in the data memory 8 is thus fixed as to its memory properties by the contents of the fraction data memory.

As is shown in FIG. 2, the data memory 8 is formed of storage cells organized row-wise and column-wise, each having a selection MOSFET 80 and a storage MOSFET 81. All of the control inputs of the selection MOSFETs 80 of a row are respectively connected through an address line A to the address decoder 4. The storage MOSFETs 81 can be addressed by a row control 7 through programming lines. The column lines for writing and reading the storage cells are connected through the series-connected controlled paths of the selection MOSFETs 80 and the storage MOSFETs 81 to a low reference potential such as 0 V. For greater clarity of presentation, only one storage cell of the data memory 8 and the associated address line, programming line and column line are shown in the figure.

Access to the data memory 8 is provided through an addressing circuit 2, 7 formed of a column control 2 and the row control 7. In order to erase a storage cell, the signal level of a programming row is increased to a high reference potential, such as 20 V and the corresponding column line is connected to the low reference potential. Writing into a storage cell is accomplished by acting on the programming row with the low reference potential and acting on the column line with a signal level corresponding to the data pattern to be stored. The level converters required for addressing the memory 7 are not shown in the figure.

With regard to each column line, the column control 2 includes an addressing MOSFET 20 acting as a diode, and further MOSFETs 21, 24. The MOSFETs 20 each connect a column line to a common junction point which is connected through a MOSFET 22 serving as a voltage divider to the controlled path of a MOSFET 23. Like the controlled path of the MOSFETs 21, the controlled path of the MOSFET 23 is connequted to the logic unit 6.

In order to write a data word into the data memory in parallel, data input lines DES are provided for each column line. The MOSFETs 24 each can be addresses through one of the lines DES. Each MOSFET 11 connects the controlled path of the associated MOSFET 21 to the low reference potential.

Outside the column control unit 2, each column line is connected to a data output line DAS through a controlled path of a MOSFET 10 which leads to the data register 1''. A data word can be transferred from the memory 8 in parallel into the data register 1'' through several data output lines DAS.

The row control 7 is formed of MOSFETs 70, 71, 7Z, 73. In this connection it should be noted that a transistor corresponding to the MOSFET 70 is associated with each row of the data memory 8, while the MOSFETs 71, 72, 73 are jointly associated with all of the rows through a common junction point.

The MOSFET 70 is addressed over the address line A as soon as the corresponding row of the data memory 8 is addressed. Depending on a respective read signal, erase signal, or write signal LES, LOE, SCHR, the common junction point is connected through one of the MOSFETs 71, 72 or 73 to a read voltage $U_{LES}$, to the high reference potential, or to the low reference potential.

The function data memory 5 is provided as a mask-programmable memory, in the embodiment of FIG. 2. The storage cells of the memory 5 are organized row-wise and column-wise, each row comprising four storage MOSFETs 50, 51, 52, 53. One of these MOSFETs is always associated with a respective first, second, third or fourth column line I, II, III or IV. The input of each colume line is connected through a load MOSFET 54 to the high reference potential and the output thereof is connected to the logic unit 6.

The controlled paths of the storage MOSFETs 50, 51, 52, 53 connect the assigned column line to the low reference potential, depending on the memcry programming. If, due to the programming, the controlled path of one or more storage MOSFETs is interrupted, the respective storage cell is considered erased (erase level logical).

If the function data memory 5 is constructed as an electrically erasable programmable memory, just like the data memory 8, each storage cell is formed of an addressing MOSFET and a storage MOSFET, the series-connected controlled paths of which connect the associated column line to the low reference potential, in a non-illustrated manner.

The control inputs of the storage MOSFETs 50, 51, 52, 53 (in the case of a mask-programmable memory) and the control inputs of the addressing MOSFETs (in the case of an electrically erasable programmable memory), are also connected row-wise to the address line A in the embodiment shown, like the data memory 8. Thus, a direct correlation of the first memory region in the data memory 8 and the second memory region in the function data memory 5 is established.

The logic unit 6 is formed of a NAND gate 60 and AND gates 61, 62. The AND gate 6Z connects the column line IV and the line addressed by the erase signal LOE to the control input of the MOSFET 72.

The column line II is connected to all of the control inputs of the MOSFETs 10 through the AND gate 61. The NAND gate 60 is connected in series with the control input of the MOSFET 23. The inputs of the NAND gate 60 are connected to the first column line I and the line carrying the write signal SCHR. The column line III leads to a setting input S of a flip-flop 90 in the read inhibitor 9. An output Q of the flip-flop 90 and a line which can be addressed by the release signal FREI, are both connected to an OR gate 91. The output of the OR gate 91 and the data output line DA' are connected to an AND gate 92 which has an output connected to the data output line DA.

The functions of the circuit are described below together with the table in FIG. 3. In the first third of the table, several examples for combinations of the logic values 1 or 0 are plotted on the column lines I, II, III, IV of the function data register 5. For each combination, the tabulation further indicates whether or not, and if applicable, under what conditions, reading, erasing or writing of the respectively addressed first memory region of the data memory 8, is possible. The last column of the table shows designations for different storage properties which are impressed on the respectively addressed memory region due to the programming of the second memory region.

If the function data memory 5 is constructed in the form of a read-only memory (ROM), a "1" in the table means that no conducting transistor is provided at the corresponding storage location. A "0" means that the corresponding column line is provided with a transistor 50, which is driven via the address line A.

If the function data memory 5 is an electrically erasable programmable memory (EEPROM), a "1" or a "0" means that the respective memory location in the function data memory 5 is erased or written, respectively.

The memory property with respect to a write operation is fixed for all memory locations of the data memory 8 through the first column line I. If the signal level on the first column line I has the logic value 1, then a write signal SCHR with respect to the selected address of the data memory 8 can be made effective through the NAND gate 60. The MOSFET 23 is then cut off and the voltage limitation of the column line in the storage field of the data memory 8 is cancelled. Writing on an addressed storage cell which has an erase level that is a logical 1, takes place if a logic level 0 can be taken off on the corresponding data input line DES, which cuts off the MOSFET 11.

If the function data memory 5 is constructed in the form of a read-only memory and if it has a conducting MOSFET 50 at the selected address, then the output of the NAND gate 60 is always at the logic value 1, independently of the write signal SCHR. Thus, the MOSSFET 23 is continuously in conduction and the write voltage on the column line of the data memory 8 cannot reach the required value.

The second column line II in the function data memory 5 permits a determination as to whether or not the memory contents of the addressed storage cells of the data memory 8 can possibly be read out into the data register "1". If the second column line II is occupied by a logic value 1 at the AND gate 62 and if a setting signal 0 is simultaneously active, the MOSFETs 10 conduct. If, on the other hand, the signal level on the column line II is a logical 0, the data output lines DAS are interrupted by the MOSFETs 10, independently of 0. The signal 0 is required ahead of every read process "data transfer" from the data memory 8 into the data register 1". The last-mentioned case can be of importance if, for instance, a first memory region of the data memory 8 contains reference data which are provided for comparison with code data entered from the outside. While the reference data must be available within the scope of the release operation, for security reasons they may not be permitted to reach the outside, not even after a successful release operation. For an internal data comparison, the memory content of the data memory 8 in series with the MOSFETs 10 must be available at a respective branching point A at every column line.

The third column line III serves to assure reading-out of storage cells of the data memory 8 independently of a release operation. Under the assumption that such a release operation is provided, the release signal FREI has the logic value 1 if the release operation is carried out successfully.

The flip-flop 90 is set by the third column line III if the signal level on the column line III assumes the logic value 1. Then, the output Q of the flip-flop 90 likewise has the logic value 1 with the result that the AND gate 92 is acted upon by the NOR gate 91 with the logic value 1. Thus, the AND gate 92 conducts, independently of the release signal FREI for a bit sequence on the data output line DA', and the register 1 can be read out without limitation. The setting signal 0, on the other hand, can reset the flip-flop 90 and thus make the data output dependent on the release signal FREI if the column line III is at a logic 0.

The property of the data memory 8 with respect to an erase operation is determined by the.fourth column line IV. If a conducting MOSFET 53 is not present at the selected address, a signal with the logic value 1 is present on the fourth column line IV, and the erase signal LOE has an influence on the control input of the MOSFET 72 through the AND gate 62.

The foregoing is a description corresponding in substance to German Application No. P 33 18 123.3, filed May 18, 1983, the International priority of which is being claimed for the instant application and which is hereby made part of this application. Any material discrepancies between the foregoing specification and the aforementioned corresponding German application are to be resolved in favor of the latter.

What is claimed:

1. Memory and addressing circuit, comprising a data memory having an input and a plurality of non-volatile storage cells being electrically writable and erasable for storing data, a function data memory having an input, an output, and at least one storage cell for storing function-control data, an address decoder having an output connected to said input of said function data memory for addressing said storage cells of said data memory and said storage cell of said function data memory, a logic unit responsive to said output of said function data memory for controlling the read, erase and write function of said data memory, and an addressing unit connected to said data memory and to said logic for reading, writing, and erasing partial regions of said data memory under control of said function-control data.

2. Circuit according to claim 1, wherein said function data memory is an electrically erasable programmable memory.

3. Circuit according to claim 1, wherein said function data memory is a mask-programmable read-only memory.

4. Circuit according to claim 1, wherein at least one address in said data memory is assigned to an address in said function data memory.

5. Circuit according to claim 4, wherein said function data memory contains a second memory region, four memory locations associated with each address in said second memory region, and column lines for reading out said memory locations.

6. Circuit according to claim 5, including means for delivering a write signal to said addressing unit, said column lines including a first column line delivering a signal for suppressing said write signal.

7. Circuit according to claim 6, including means for delivering a read signal to said addressing unit, said column lines including a second column line delivering a signal for suppressing said read signal.

8. Circuit according to claim 7, including a read inhibitor connected to said function data memory, a register connected to said read inhibitor and being acted upon by said read inhibitor, means for delivering a release signal to said read inhibitor, and said column lines including a third column line connected to said read inhibitor for neutralizing said read inhibitor independently of said release signal.

9. Circuit according to claim 8, including means for delivering an erase signal to said addressing unit, said column lines including a fourth column line delivering a signal for suppressing said erase signal.

* * * * *